(12) United States Patent
Whitmore et al.

(10) Patent No.: US 7,258,905 B2
(45) Date of Patent: **\*Aug. 21, 2007**

(54) SEALABLE FOOD CONTAINER WITH IMPROVED LIDDING AND STACKING FEATURES

(75) Inventors: Rebecca E. Whitmore, Chilton, WI (US); Mark B. Littlejohn, Appleton, WI (US); Margaret P. Neer, Neenah, WI (US); Debra D. Bowers, Menasha, WI (US); Jerome G. Dees, Appleton, WI (US); Gerald J. Van Handel, Neenah, WI (US)

(73) Assignee: Dixie Consumer Products LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/068,924

(22) Filed: Feb. 8, 2002

(65) Prior Publication Data

US 2002/0122907 A1     Sep. 5, 2002

Related U.S. Application Data

(63) Continuation-in-part of application No. 09/921,264, filed on Aug. 2, 2001, now Pat. No. 6,733,852.

(60) Provisional application No. 60/305,225, filed on Jul. 13, 2001, provisional application No. 60/223,209, filed on Aug. 4, 2000.

(51) Int. Cl.
*B65D 21/02* (2006.01)
*B65D 41/16* (2006.01)

(52) U.S. Cl. .................... 428/35.7; 428/34.1; 428/36.5; 428/36.6; 428/36.8; 220/23.86; 220/780; 220/781; 206/501; 206/509; 206/512

(58) Field of Classification Search ............... 220/4.26, 220/4.27, 4.23, 4.22, 781, 23.86, 780, 4.21, 220/784, 790; 206/509, 512, 501; 428/34.1, 428/35.7, 36.5, 36.6, 36.8
See application file for complete search history.

(56) References Cited

U.S. PATENT DOCUMENTS 2,630,237 A     3/1953 Rosenlof
(Continued)

FOREIGN PATENT DOCUMENTS

JP     51-159550     7/1978
JP     58-78235     11/1984

*Primary Examiner*—Jennifer McNeil
*Assistant Examiner*—Walter B Aughenbaugh
(74) *Attorney, Agent, or Firm*—Georgia-Pacific LLC; Jacqueline M. Hutter (57) ABSTRACT

A sealable food container includes a base serving member such as a plate having a generally planar central portion, a sidewall extending generally upwardly and outwardly therefrom and a base outer flange portion extending outwardly from the sidewall. The sidewall defines a sealing area with an undercut annular sealing surface disposed between the substantially planar central portion of the base serving member and the base outer flange portion. The sidewall portion of the plate defines a base stop ridge adjacent the upper edge of the undercut annular sealing surface of the sidewall as well as a laterally extending retaining shelf adjacent the lower edge of the undercut annular sealing surface of the base serving member. A matching sealing lid is typically provided with a dome, a flexible sidewall and an annular sealing portion configured to cooperate with the base stop ridge and the sealing surface of the serving member sidewall of the base serves to position the sidewall engaging cover during sealing of the container. In a preferred embodiment, the sidewall of the lid has upwardly projecting flutes and the base has an outer recess at the lower portion of its sidewall configured to engage the upwardly projecting flutes to render the containers securely stackable.

82 Claims, 6 Drawing Sheets

U.S. PATENT DOCUMENTS

| | | |
|---|---|---|
| 2,811,152 A | 10/1957 | Wicks |
| 2,914,104 A | 11/1959 | Jocelyn |
| 3,101,864 A | 8/1963 | Glickman |
| 3,107,027 A | 10/1963 | Hong |
| 3,139,131 A | 6/1964 | Hutchinson |
| 3,303,964 A | 2/1967 | Luker |
| 3,511,288 A | 5/1970 | Swett et al. |
| 3,633,785 A | 1/1972 | Cyr et al. |
| 3,690,902 A | 9/1972 | Dahl |
| 3,779,418 A | 12/1973 | Davis |
| 3,938,688 A | 2/1976 | Ryan |
| 4,505,962 A * | 3/1985 | Lu .................... 428/36.5 |
| 4,555,043 A | 11/1985 | Bernhardt |
| 4,700,842 A * | 10/1987 | Grusin .................... 206/508 |
| 4,741,452 A | 5/1988 | Holzkopf |
| 4,776,459 A | 10/1988 | Beckerman et al. |
| 4,874,083 A | 10/1989 | Antoni et al. |
| 4,911,978 A * | 3/1990 | Tsubone et al. ......... 428/317.9 |
| 4,960,639 A | 10/1990 | Oda et al. |
| 5,220,999 A | 6/1993 | Goulette |
| 5,269,430 A * | 12/1993 | Schlaupitz et al. ........ 220/4.23 |
| 5,287,959 A | 2/1994 | Hansen et al. |
| D345,912 S | 4/1994 | Krupa |
| 5,377,860 A * | 1/1995 | Littlejohn et al. .......... 220/306 |
| D358,091 S | 5/1995 | Warburton |
| 5,427,266 A * | 6/1995 | Yun ........................ 220/377 |
| 5,441,166 A | 8/1995 | Lucas, Jr. et al. |
| 5,500,261 A | 3/1996 | Takei et al. |
| 5,685,453 A | 11/1997 | Goins et al. |
| 5,860,549 A | 1/1999 | Allers et al. |
| 5,915,581 A | 6/1999 | Pfirrmann, Jr. et al. |
| D415,024 S | 10/1999 | McCann |
| 6,120,863 A | 9/2000 | Neculescu et al. |
| D450,580 S | 11/2001 | Littlejohn et al. |
| 6,440,509 B1 * | 8/2002 | Littlejohn et al. ......... 428/35.7 |
| 6,595,366 B1 | 7/2003 | Brown |
| 6,733,852 B2 * | 5/2004 | Littlejohn et al. ......... 428/35.7 |
| 2002/0122907 A1 | 9/2002 | Whitmore et al. |
| 2002/0175171 A1 | 11/2002 | Stewart et al. |

* cited by examiner

SEALABLE FOOD CONTAINER WITH IMPROVED LIDDING AND STACKING FEATURES

CROSS-REFERENCE TO RELATED APPLICATIONS

This application is a continuation-in-part of U.S. patent application Ser. No. 09/921,264, entitled "Disposable Serving Plate With Sidewall-Engaged Sealing Cover", filed Aug. 2, 2001 now U.S. Pat. No. 6,733,852. U.S. patent application Ser. No. 09/921,264 now U.S. Pat. No. 6,733,852 was based on Provisional Application No. 60/223,209, filed Aug. 4, 2000 of the same title; This application also incorporates material in U.S. Provisional Patent Application No. 60/305,225, entitled "Crush-Resistant Disposable Lid", filed Jul. 13, 2001; the priorities of the foregoing applications are hereby claimed.

TECHNICAL FIELD

The present invention relates generally to food containers. In a preferred embodiment, there is provided a serving plate with a sidewall-engaged sealing cover so as to provide for storage and transport as well as serving of the contents.

BACKGROUND

Sealable food containers are known in the art. Illustrative in this respect is U.S. Pat. No. 5,377,860 to Littlejohn et al. In the '860 patent there is disclosed a container having a base with an upwardly projecting sidewall integrally formed with a brim. The brim of the base is formed with a number of integral cooperating features including a reinforcing hoop and sealing surfaces. A lid is configured to fit the base and includes a dome as well as a lid brim configured to cooperate with the brim of the base. Thus, in accordance with the '860 patent there is provided a food container with a flexible brim seal between the lid and base which is provided by way of the respective brim designs.

The present invention is likewise directed to a sealable food container, wherein the base is preferably in the form of a platter, bowl or plate provided with a sidewall and an arcuate flange portion as well as a sealing lid which engages the sidewall of the base. As such, the present invention provides improved graspability and utility as a food service article as opposed to being designed primarily for storage and reheating. Preferred embodiments include a novel sidewall sealing system as well as stacking features as described hereafter.

SUMMARY OF THE INVENTION

There is provided in a first aspect of the present invention a sealable food container including a base serving member having a generally planar base central portion, a base sidewall extending generally upwardly and outwardly therefrom and a base outer flange portion extending outwardly from the base sidewall. The base sidewall defines a sealing portion with (i) an undercut annular base sealing surface, (ii) a base stop ridge adjacent the upper edge of the annular base sealing surface, as well as (iii) a laterally extending retaining shelf adjacent the lower edge of the annular base sealing surface.

A sealing lid is provided with a dome portion and a flexible lid sidewall extending downwardly from the dome portion as well as a lid flange portion extending outwardly with respect to the downwardly extending sidewall of the lid. The lid flange portion defines a sealing portion with an annular lid sealing surface extending upwardly with respect to the downwardly extending sidewall of the sealing lid. The sealing portion of the lid also defines a lid stop ridge, typically at the upper edge of the annular lid sealing surface. The base serving member and the sealing lid are configured such that when the sealing lid is forced downwardly on the base serving member the sealing lid is secured to the base serving member by cooperation of the base stop ridge of the base serving member and the lid stop ridge of the sealing lid. Moreover, the laterally extending retaining shelf in the base sidewall serves to position the lid with respect to the base.

Generally, the laterally extending retaining shelf of the base serving member extends outwardly over a base sidewall shelf length of at least about 0.5% of the characteristic diameter of the base serving member. In most cases, the sidewall shelf length of the base serving member is at least about 1% of the characteristic diameter of the base serving member and is frequently at least about 1.5% of the characteristic diameter of the base serving member. The sealing lid is preferably provided with a laterally extending lid shelf extending between the flexible sidewall of the sealing lid and the annular sealing surface of the lid wherein the lid shelf extends outwardly over a lid shelf radial span and is adapted to cooperate with the retaining shelf of the base serving member to position the sealing lid with respect thereto. Typically, the lid shelf radial span is at least about 25% of the base sidewall retaining shelf length and in preferred embodiments the lid shelf radial span is at least about 50% of the base sidewall retaining shelf length. In many embodiments, the lid shelf radial span is at least about 75% of the base sidewall retaining shelf length.

In a preferred embodiment, the undercut annular sealing surface of the base serving member is a frustal sealing surface extending upwardly and outwardly with respect to the substantially planar central portion of the base serving member and the annular sealing surface of the lid is a frustal sealing surface extending upwardly and outwardly with respect to the downwardly extending sidewall of the sealing lid. The base stop ridge is typically located adjacent the upper edge of the sealing surface of the sidewall of the base and the lid stop ridge typically is located adjacent the upper edge of the sealing surface of the sealing lid. The sealing lid is preferably configured and dimensioned so as to outwardly flexibly urge the frustal sealing surface of the lid into surface to surface contact with the frustal sealing surface of the base serving member when a base serving member and the sealing lid are secured to one another. In preferred embodiments, both the outer flange of the base and the outer flange of the lid are arcuate outer flanges. So also, the flexible sidewall of the sealing lid is preferably a fluted sidewall. Generally, the dome portion of the sealing lid has a generally planar upper surface portion and a downwardly extending sidewall preferably provided with a plurality of outwardly convex flutes formed in the sidewall, wherein the flutes have a characteristic cylindrical diameter or a plurality of characteristic diameters and wherein the lid includes about 3 or fewer flutes per inch of engagement perimeter.

As used herein, the term "engagement perimeter" refers to the circumferential length at the lower edge of the base stop ridge around the base, which corresponds roughly to the circumferential length at the upper edge of the annular sealing surface of the lid as well.

Outwardly convex flutes may be circumferentially spaced apart from one another along the sidewall optionally by relatively flat sidewall segments of the lid. The flutes may be spaced apart by circumferential distances varying in the range of from about 0.05 inches to about 0.25 inches in some embodiments.

Preferably, the convex flutes project upwardly with respect to the generally planar upper surface portion of the dome and define a retaining ridge upper profile which is raised with respect to the planar part of the dome and the base member is provided with a stacking annular recess at the lower portion of the sidewall of the base adapted to engage the raised retaining ridge profile. The annular recess is a stacking feature adapted to engage the raised retaining ridge profile of the sealing lid in order to render a plurality of sealable food containers configured in accordance with the present invention securely stackable with one another. Preferably, the stacking recess has an arcuate profile for ease of forming and which also will not result in a sharp corner in the interior of the base which may interfere with the use of the base as a food service article. That is, a sharp interior corner can interfere with the use of an eating utensil such as a fork or spoon when the base is a plate or bowl. The retaining ridge likewise has arcuate inner profile in preferred embodiments.

Typically, the retaining ridge profile on the upper surface of the sealing lid comprises a plurality of spaced flute profiles extending inwardly from the outer edge of the flexible sidewall of the lid and extending upwardly with respect to the planar portion of the dome as shown, for example in the appended figures. Those profiles may be arcuate with a top generally flat portion if so desired and may likewise be uniform or include a plurality of different size flutes with different characteristic flute diameters and heights above the dome if so desired. The sealing lid may include from about 1.5 to about 2.5 flutes per inch of engagement perimeter or more typically from about 2 to about 2.5 flutes per inch of engagement perimeter are provided. The flutes may have any suitable characteristic cylindrical diameter which is typically from about 0.2 inches to about 0.80 inches. The characteristic cylindrical diameter of the flutes is preferably at least about 0.75% of the length of engagement perimeter of the sealing lid. Typically the characteristic cylindrical diameter of convex flutes is in the range of from about 1% to about 2.5% of the length of the engagement perimeter. As noted above, the flute profiles extend upwardly as well as inwardly with respect to the generally planar central portion of the lid's dome. An inward extension length of the flutes from the outer periphery of the lid adjacent the generally planar upper surface portion of the dome is usually at least about 0.2 inches and typically at least about 0.3 inches. That extension may be flat or arcuate. The upper inward extension length of the flutes above the generally planar upper surface portion of the dome from their outer periphery is usually from about 1% to about 3% of the length of the engagement perimeter of the sealing lid. The flutes may have a flute height above the generally planar upper surface portion of the dome, of greater than about 0.07 inches and typically from about 0.07 inches to about 0.15 inches. The dome portion and sidewall of the sealing lid is provided in a preferred embodiment with a plurality of generally raised flat portions between the convex flutes having generally a circumferential span of about 0.05 to about 0.2 inches. These flat portions have a height above the generally planar upper surface portion of the dome of from about 0.01 inches to about 0.1 inches.

The sealing lid is preferably provided with a laterally extending lid shelf with an optionally sinuous edge extending between the flexible sidewall of the seating lid and the annular sealing surface of the lid wherein the lid shelf extends outwardly over a radial span and is adapted to cooperate with the retaining shelf of the base serving member to position the serving lid with respect thereto. The laterally extending retaining shelf of the base serving member preferably extends over a distance of at least about 25% of the characteristic diameter of the convex flutes of the sealing lid.

In typical embodiments, the base serving member and the sealing lid are formed from sheet thermoplastic material. Such material may be in the form of a continuous roll or web or precut into individual sheets if so desired. The base serving member and sealing lid are thermoformed, thermoformed by the application of vacuum or thermoformed by a combination of vacuum and pressure.

The thermoplastic material from which the base or lid is formed may include a foamed or solid polymeric material selected from the group consisting of polyesters, polystyrenes, polypropylenes, polyethylenes and mixtures thereof The base member is perhaps most preferably thermoformed from a mineral filled, polypropylene sheet. The serving base member may have a wall thickness of from about 10 to about 80 mils and consist essentially of from about 40 to about 90% by weight of a polypropylene polymer, from about 10 to about 60% by weight of a mineral filler, from about 1 to about 15% by weight polyethylene, up to about 5 weight percent titanium dioxide and optionally including a basic organic or inorganic compound comprising the reaction product of an alkali metal or alkaline earth metal with carbonates, phosphates, carboxylic acids as well as alkali metal and alkaline earth element oxides, hydroxides, or silicates and basic metal oxides, including mixtures of silicon dioxide with one or more of the following oxides: magnesium oxide, calcium oxide, barium oxide, and mixtures thereof. The base serving member may typically have a wall caliper from about 10 to about 50 mils (thousandths of an inch), whereas from about 12 to about 25 mils is typical.

The sealing lid is perhaps most preferably formed of a styrene polymer composition. That composition may be a styrene butadiene copolymer, or simply be oriented polystyrene. The sealing lid typically has a wall caliper of from about 2 to about 15 mils and may have a caliper of from about 5 to about 13 mils.

In another aspect of the invention there is provided a base serving member having a generally planar base central portion, a base sidewall extending generally upwardly and outwardly therefrom and a base outer flange portion extending outwardly from the sidewall. The base serving member includes a base sealing portion outwardly disposed with respect to the generally planar central portion as well as an annular stacking sidewall recess at the lower part of the sidewall. A sealing lid configured to cooperate with the base serving member includes a dome portion having a generally planar upper central surface and a flexible lid sidewall extending downwardly from the dome portion. The sealing lid defines an annular sealing portion and is preferably provided with a plurality of outwardly convex flutes in the flexible lid sidewall projecting upwardly with respect to the generally planar upper central surface of the dome portion of the sealing lid to define a retaining ridge profile at the outer edge of the central portion of the dome. The base serving member and the sealing lid are configured such that when the sealing lid is forced downwardly on the base serving member, the annular lid sealing portion of the sealing lid cooperates with the base sealing portion of the serving member to secure the sealing lid to the serving base member. The annular sidewall recess at the base of the sidewall of the serving member is adapted to engage with the generally raised retaining ridge profile of the sealing lid to render a plurality of the sealable food containers securely stackable with one another. Preferably, both tile profile of the base stacking recess and the profile of the retaining ridge are arcuate.

These and other features of the present invention are further described in connection with the Figures attached hereto.

BRIEF DESCRIPTION OF DRAWINGS

The present invention is described in connection with the various figures appended hereto wherein like numbers designate similar parts and wherein.

DETAILED DESCRIPTION

The present invention is described in detail below for purposes of exemplification and illustration, only. Modification of specific embodiments or variations thereof within the spirit and scope of the appended claims will be readily apparent to those of skill in the art. In general, the present invention is directed to a sealable food container and preferably a disposable food container including a base such as a platter or a plate having a sidewall extending upwardly and outwardly from its central portion and a sealing lid with a sealing surface configured to engage the sidewall in sealing contact. The seal is preferably continuous and substantially liquid-proof, whereas the materials forming the plate or platter and the sealing cover are resilient and flexible. These materials are also preferably selected so as to be suitable for heating or re-heating the contained food, for example, by way of a conventional or microwave oven or by heat lamps and so forth.

The containers of the invention are made by any suitable technique, typically, techniques employed for forming plastics. The products may thus be made from thermoplastic sheet which has been pre-cut or in the form of a continuous web or roll formed, thermoformed, thermoformed by the application of vacuum or thermoformed by a combination of vacuum and pressure into the products of the invention. Alternatively, the inventive containers may be made from a plastic material by injection molding, injection blow molding, compression molding, injection stretch molding, composite injection molding and so forth. Thermoforming from plastic sheet is particularly preferred.

In the simplest form, thermoforming is the draping of a softened sheet over a shaped mold. In the more advanced form, thermoforming is the automatic high speed positioning of a sheet having an accurately controlled temperature into a pneumatically actuated forming station whereby the article's shape is defined by the mold, followed by trimming and regrind collection as is well known in the art. Still other alternative arrangements include the use of drape, vacuum, pressure, free blowing, matched die, billow drape, vacuum snap-back, billow vacuum, plug assist vacuum, reverse draw with plug assist, pressure bubble immersion, trapped sheet, slip, diaphragm, twin-sheet cut sheet, twin-sheet roll-fed forming or any suitable combinations of the above. Details are provided in J. L. Throne's book, *Thermoforming*, published in 1987 by Coulthard. Pages 21 through 29 of that book are incorporated herein by reference. Suitable alternate arrangements also include a pillow forming technique which creates a positive air pressure between two heat softened sheets to inflate them against a clamped male/female mold system to produce a hollow product. Metal molds are etched with patterns ranging from fine to coarse in order to simulate a natural or grain-like texturized look. Suitable formed articles are trimmed in line with a cutting die and regrind is optionally reused since the material is thermoplastic in nature. Other arrangements for productivity enhancements include the simultaneous forming of multiple articles with multiple dies in order to maximize throughput and minimize scrap.

A particularly preferred material for a plate or platter is mica-filled polypropylene, optionally provided with calcium carbonate, polyethylene and titanium dioxide in suitable amounts as hereinafter described. The sealing lid or cover may be opaque or transparent and is most preferably made of a transparent styrene polymer composition. Typically, the lid is oriented or rubberized to give it sufficient rigidity and flexibility to provide a good seal. As will be appreciated by one of skill in the art, suitable polymeric materials for the disposable plate and cover are readily available. Mineral filled polypropylene, especially mica filled polypropylene is, for example, suitable for the base as noted above. Other suitable flexible and resilient materials include other polyolefins such as polyethylenes, polypropylenes and mixtures and copolymers thereof, polyesters, polyamides, polyacrylates, polystyrenes, polysulfones, polyether ketones, polycarbonates, acrylics, polyphenylene sulfides, acetals, cellulosics, polyetherimides, polyphenylene ethers/oxides, styrene maleic anhydride copolymers, styrene acrylonitrile copolymers, polyvinylchlorides, and engineered resin derivatives thereof. These materials may be filled or unfilled, solid (continuous) or foamed.

A platter, bowl or plate of the food container of the present invention may be produced utilizing polymeric compositions filled with conventional inorganic fillers such as talc, mica, wollastonite and the like, wherein the polymer component is, for example, a polyester, a polystyrene homopolymer or copolymer, a polyolefin or one or more of the polymers noted above. While any suitable polymer may be used, polypropylene polymers which are suitable for the plate, bowl or platter are preferably selected from the group consisting of isotactic polypropylene, and copolymers of propylene and ethylene wherein the ethylene moiety is less than about 10% of the units making up the polymer, and mixtures thereof. Generally, such polymers have a melt flow index from about 0.3 to about 4, but most preferably the polymer is isotactic polypropylene with a melt-flow index of about 1.5. In some preferred embodiments, the melt-compounded composition from which the articles are made may include polypropylene and optionally further includes a polyethylene component and titanium dioxide. A polyethylene polymer or component may be any suitable polyethylene such as HDPE, LDPE, MDPE, LLDPE or mixtures thereof and may be melt-blended with polypropylene if so desired.

The various polyethylene polymers referred to herein are described at length in the *Encyclopedia of Polymer Science & Engineering* (2d Ed.), Vol. 6; pp: 383–522, Wiley 1986; the disclosure of which is incorporated herein by reference. HDPE refers to high density polyethylene which is substantially linear and has a density of generally greater that 0.94 up to about 0.97 g/cc. LDPE refers to low density polyethylene which is characterized by relatively long chain branching and a density of about 0.912 to about 0.925 g/cc. LLDPE or linear low density polyethylene is characterized by short chain branching and a density of from about 0.92 to about 0.94 g/cc. Finally, intermediate density polyethylene (MDPE) is characterized by relatively low branching and a density of from about 0.925 to about 0.94 g/cc.

Typically, in filled plastics useful for making the plate or container base of the food container the primary mineral filler is mica, talc, kaolin, bentonite, wollastonite, milled glass fiber, glass beads (solid or hollow), silica, or silicon carbide whiskers or mixtures thereof. We have discovered that polypropylene may be melt-compounded with acidic-type minerals such as mica, as well as inorganic materials and/or basic materials such as calcium carbonate. Other fillers include talc, barium sulfate, calcium sulfate, magnesium sulfate, clays, glass, dolomite, alumina, ceramics, calcium carbonate, silica, pigments such as titanium dioxide based pigments and so on. Many of these materials are enumerated in the *Encyclopedia of Materials Science and Engineering*, Vol.#3, pp. 1745–1759, MIT Press, Cambridge, Mass. (1986), the disclosure of which is incorporated herein by reference. Combinations of fillers are preferred in some embodiments.

Mineral fillers are sometimes referred to by their chemical names. Kaolins, for example, are hydrous alumino silicates, while feldspar is an anhydrous alkalialumino silicate. Bentonite is usually an aluminum silicate clay and talc is hydrated magnesium silicate. Glass, or fillers based on silicon dioxide may be natural or synthetic silicas. Wollastonite is a calcium metasilicate whereas mica is a potassium alumino silicate. Clays may be employed as a primary filler; the two most common of which are kaolin and bentonite. Kaolin refers generally to minerals including kaolinite which is a hydrated aluminum silicate ($Al_2O_3.2SiO_2.2H_2O$) and is the major clay mineral component in the rock kaolin. Kaolin is also a group name for the minerals kaolinite, macrite, dickite and halloysite. Bentonite refers to hydrated sodium, calcium, iron, magnesium, and aluminum silicates known as montmorillonites which are also sometimes referred to as smectites.

Fillers commonly include: barium salt; barium ferrite; barium sulfate; carbon/coke powder; calcium fluoride; calcium sulfate; carbon black; calcium carbonate; ceramic powder; chopped glass; clay; continuous glass; glass bead; glass fiber; glass fabric; glass flake; glass mat; graphite powder; glass sphere; glass tape; milled glass; mica; molybdenum disulfide; silica; short glass; talc; whisker. Particulate fillers, besides mica, commonly include: glass; calcium carbonate; alumina; beryllium oxide; magnesium carbonate; titanium dioxide; zinc oxide; zirconia; hydrated alumina; antimony oxide; silica; silicates; barium ferrite; barium sulphate; molybdenum disulfide; silicon carbide; potassium titanate; clays. Fibrous fillers are commonly: whiskers; glass; mineral wool; calcium sulphate; potassium titanate; boron; alumina; sodium aluminum hydroxy carbonate.

As noted above, a mica-filled polypropylene polymer composition is particularly preferred for forming the base or plate portion of the container.

The dome portion of the present invention may be formed of any of the materials described above, and is perhaps most preferably formed from an oriented or rubberized polystyrene composition, optically transparent materials being preferred in many cases. The lid or dome may be thermoformed from biaxially oriented polystyrene sheet (OPS) or can include polystyrene and a blended rubber component or may be a styrene/rubber copolymer such as K resin. K resin is a copolymer of styrene and butadiene and is available from Phillips Petroleum, Bartlesville, Okla. Preferred grades included from about 2 to about 40 wt. % butadiene. Alternatively or in addition to diene comonomer, the styrene compositions may contain one or more of the rubbery polymers discussed below.

So-called core-shell polymers built up from a rubber-like core on which one or more shells have been grafted may be used. The core usually consists substantially of an acrylate rubber or a butadiene rubber. One or more shells have been grafted on the core. Usually these shells are built up for the greater part from a vinylaromatic compound and/or a vinylcyanide and/or an alkyl(meth)acrylate and/or (meth)acrylic acid. The core and/or the shell(s) often comprise multifunctional compounds which may act as a cross-linking agent and/or as a grafting agent. These polymers are usually prepared in several stages.

Olefin-containing copolymers such as olefin acrylates and olefin diene terpolymers can also be used as rubbery modifiers in the present compositions. An example of an olefin acrylate copolymer modifier is ethylene ethylacrylate copolymer available from Union Carbide as DPD-6169. Other higher olefin monomers can be employed as copolymers with alkyl acrylates, for example, propylene and n-butyl acrylate. The olefin diene terpolymers are well known in the art and generally fall into the EPDM (ethylene propylene diene) family of terpolymers. They are commercially available such as, for example, EPSYN 704 from Copolymer Rubber Company. They are more fully described in U.S. Pat. No. 4,559,388, incorporated by reference herein.

Various rubber polymers and copolymers as such can also be employed as modifiers. Examples of such rubbery polymers are polybutadiene, polyisoprene, and various other polymers or copolymers having a rubbery dienic monomer.

Styrene-containing rubbery polymers are also suitable modifiers. Examples of such polymers are acrylonitrile-butadiene-styrene, styrene-acrylonitrile, acrylonitrile-butadiene-alpha-methylstyrene, styrene-butadiene, styrene butadiene styrene, diethylene butadiene styrene, methacrylate-butadiene-styrene, high rubber graft ABS, and other high impact styrene-containing polymers such as, for example, high impact polystyrene. Other known impact modifiers include various elastomeric materials such as organic silicone rubbers, elastomeric fluorohydrocarbons, elastomeric polyesters, the random block polysiloxane-polycarbonate copolymers, and the like. The preferred organopolysiloxane-polycarbonate block copolymers are the dimethylsiloxane-polycarbonate block copolymers in some embodiments.

The sealable containers according to the present invention may have any particular size and shape as desired so long as the relative base and lid features are present. More specifically, square or rectangular with rounded corners, triangular, oval, multi-sided, polyhedral, and similar shapes may be made having the profile described above including plates, bowls, platters, and common lidding features such as 6 1/16-inch and 12 oz., 7 5/16-inch and 20 oz. plates and bowls. In various embodiments of the present invention the container may be 6 1/16-inch, 7 5/16-inch, 9-inch, 10 1/4-inch and 11-inch plates and so forth. The container may include a compartmented base in the form of a plate of the class described in co-pending U.S. patent application Ser. No. 09/354,706, filed Jul. 16, 1999, entitled "Compartmented Disposable Plate With Asymmetric Rib Geometry", now U.S. Pat. No. 6,440,509, the disclosure of which is hereby incorporated by reference.

Throughout this specification and claims, the term "dome" and its derivatives are used in the broad sense of a vault, ceiling, cover or roof having an inner surface which is generally concave regardless of whether the inner surface is hemispherical, polyhedral or another compound shape.

Referring to the various Figures there is shown a sealable food container 10 including a plate 12 having a generally planar central portion 14, a plate sidewall 16 extending generally upwardly and outwardly therefrom and a plate outer flange portion 18 extending outwardly from the sidewall. The planar central portion or bottom 14 of the plate may be provided with a slight crown if so desired as is known in the art to prevent rocking when the container is placed on a flat surface. The plate is generally circular with a characteristic diameter, D which may be, for example, about 10 1/4 inches and have a circumference around its sealing area of between 25 and 30 inches or so; that is, the diameter of the stop ridge about its lower edge in the sidewall may be about 8 5/8 inches for a plate with a characteristic diameter of 10 1/4 inches. The characteristic diameter of a container base used in connection with the present invention is the diameter across the outermost portion of the article for a generally circular article such as a plate. For other shapes, an average diameter may be used.

Sidewall 16 defines a sealing portion 20 with an undercut annular sealing surface 22 disposed between the substantially planar central portion 14 of plate 12 and the plate outer flange portion 18. Sidewall sealing portion 20 defines a base stop ridge 24 at the upper edge 26 of the undercut annular sealing surface 22 of the sidewall. There is further defined by the sidewall a laterally extending retaining shelf 28 adjacent to undercut annular sealing surface 22. Shelf 28 is generally horizontal (parallel to planar portion 14) and located adjacent lower edge 29 of annular plate sealing surface 22 as shown. Shelf 28 has a shelf length 31 over the generally horizontal span between edge 29 of surface 22 and an inner edge 27 of shelf 28.

Figure 6:
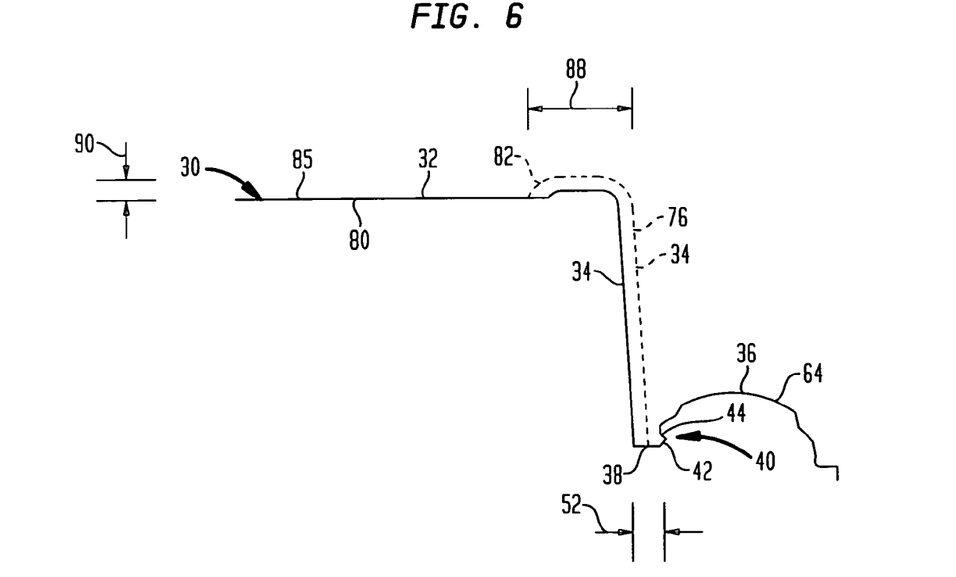
FIG. 6 is a schematic diagram comparing the profile of the flat portions between flutes and the outwardly convex flutes about the periphery of the sealing lid of the inventive container.
Figure 7:
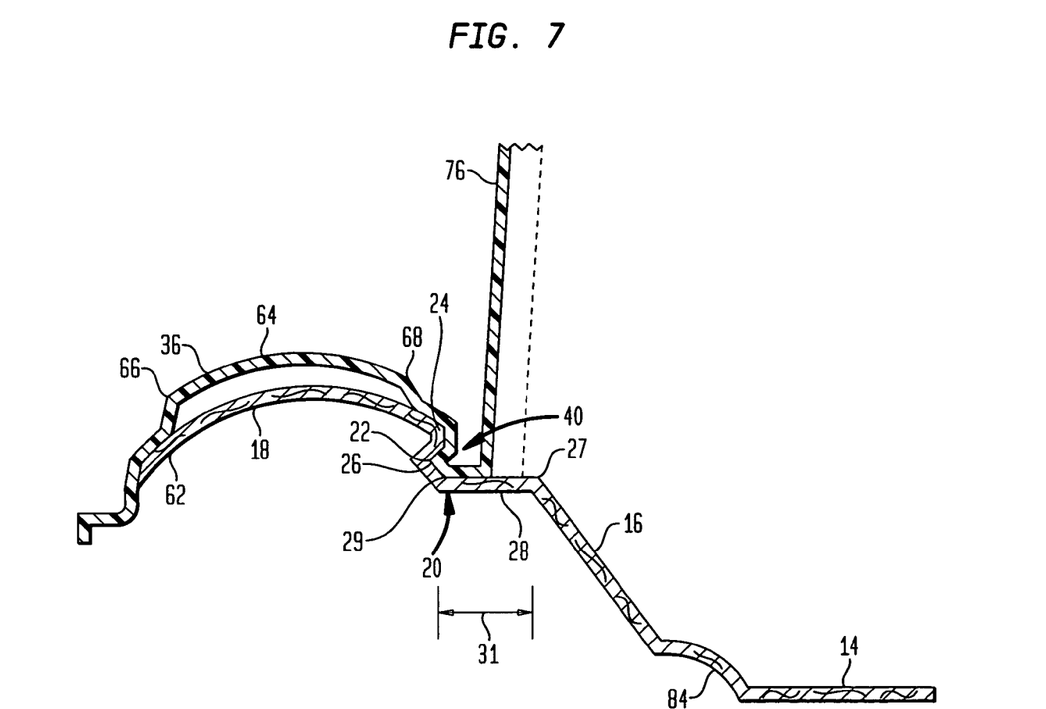
FIG. 7 is an enlarged schematic detail illustrating the cooperation of the base serving member and the sealing lid to secure the inventive lid and base to one another and provide a sealed interior; and preferably, a substantially liquid proof seal.

Container 10 also includes a scaling lid 30 provided with a lid dome portion 32, a flexible lid sidewall 34 extending downwardly from dome portion 32. Both the flat portion of sidewall 34 and fluted portion of sidewall 34 are shown in FIG. 6. The lid also has a lid flange portion 36 extending outwardly with respect to the downwardly extending lid sidewall. The lid flange portion includes at its inner periphery 38 a lid sealing portion 40. Lid sealing portion 40 defines a frustal sealing surface 42 extending upwardly and outwardly with respect to the downwardly extending sidewall of the seating lid. Lid sealing portion 40 also defines a lid stop ridge 44, generally adjacent an upper edge 45 of surface 42. The plate and the sealing lid are configured such that when the sealing lid is forced downwardly on plate 12 sealing lid 30 is secured to the base serving member by cooperation of base stop ridge 24 and lid stop ridge 44.

Laterally extending retaining shelf 28 of plate 12 extends outwardly over a base shelf length 31 which is generally at least about 0.5% of the characteristic diameter D of plate 12. The characteristic diameter of the container is taken as the diameter, for example, of the base serving member in the case of a round plate as shown. With respect to other shapes that may be employed in accordance with the present invention, the characteristic diameter of the base serving member such as a plate or plater is taken as the average dimension across the base, for example, for a rectangular or polygonal shape, one simply would take a mean span across the article from one outer edge to its opposite outer edge across the middle of the article.

Referring in particular to FIGS. 3 through 5–7, the sealing lid is preferably provided with a laterally extending lid shelf 50 extending between flexible sidewall 34 of the sealing lid and the annular sealing surface 42 of lid 30. Lid shelf 50 extends outwardly over a lid shelf radial span 52 and is adapted to cooperate with the retaining shelf of plate 12 to position the sealing lid with respect to the base. It should be noted as used herein, the term "lid shelf radial span" refers to maximum span 52 from an inner edge 54 of the shelf to an outer edge 55 of lid shelf 50 such that in the case of a lid stop shelf that has a fluted or scalloped inner edge, the lid stop shelf radial span 52 is the maximum distance between inner edge 54 of the lid stop shelf and the upwardly and outwardly extending annular sealing surface 42 of sealing portion 40, as is shown at 56, for example. As noted above, the length of the lid shelf radial span is typically at least about 25% of base sidewall shelf length 31. Preferably the lid shelf radial span is greater than that.

In preferred embodiments, undercut scaling surface 22 of plate 12 is a frustal sealing surface extending upwardly and outwardly with respect to substantially planar central portion 14 of plate 12. Annular sealing portion 40 of sealing lid 30 also preferably includes a frustal configuration of sealing surface 42 extending upwardly arid outwardly with respect to the downwardly extending sidewall of sealing lid 30.

Preferably base stop ridge 24 is located adjacent the upper edge of sealing surface 22 of sidewall 16 of plate 12; whereas lid stop ridge 44 is located adjacent the upper edge of sealing surface 42 of the lid. The lid is dimensioned so as to outwardly flexibly urge its frustal sealing surface 42 into surface to surface contact with frustal sealing surface 22 of plate 12 (also in a frustal configuration) when plate and sealing lid 30 are secured to one another.

Figure 8:
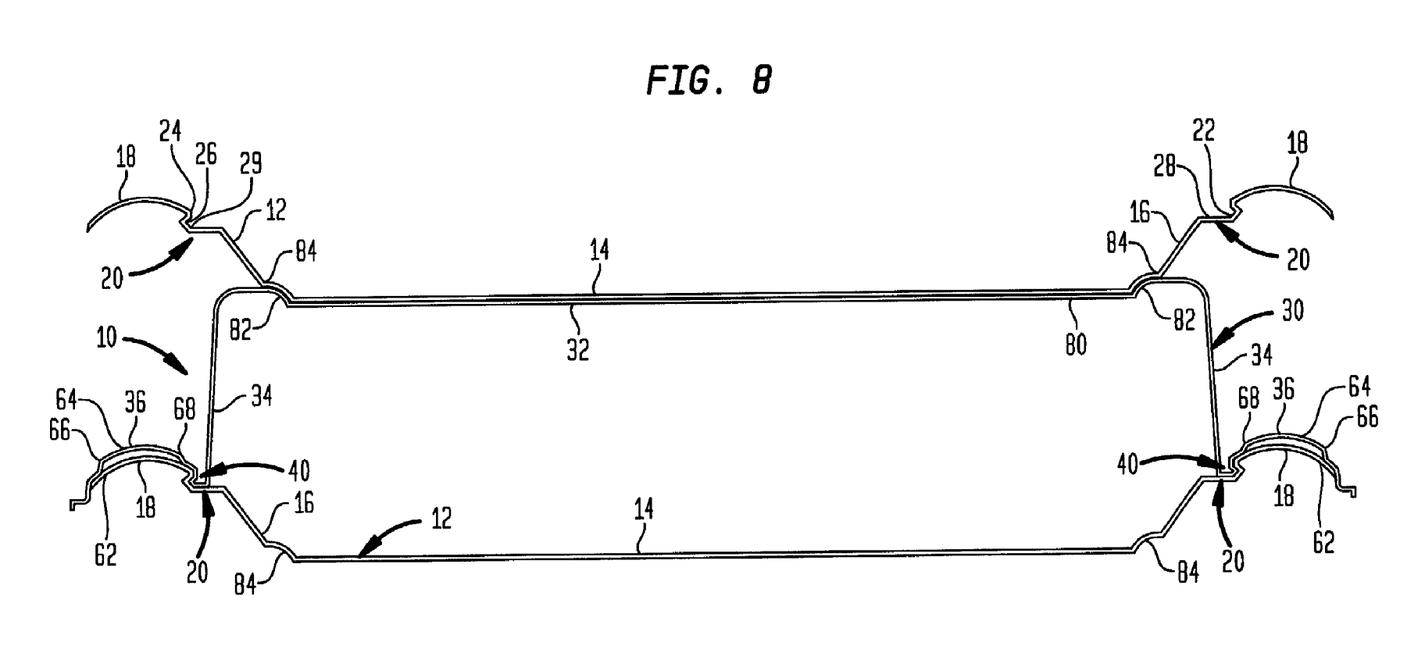
FIG. 8 is a schematic diagram illustrating the cooperation of the inventive stacking features of the present invention to provide a secure stack of containers.

Both the base serving member, typically a plate, and sealing lid may be provided with an arcuate outer flange. Outer arcuate flange 62 of plate 12 is generally arcuate in shape typically having a radius of curvature which is more or less constant. On the other hand, arcuate outer flange 64 of sealing lid 30 may have a plurality of ridges such as ridges 66 and 68 in its profile if so desired. In any case, sealing lid outer flange 64 is generally configured to overlay arcuate outer flange 62 of the plate as shown particularly in FIGS. 7 and 8.

Flexible sidewall 34 old sealing lid 30 is provided with a plurality of outwardly convex flutes 76 formed in the sidewall. Typically lid 30 includes about 3 or fewer flutes per inch of engagement perimeter, that is the circumferential length about the lower edge of base stop ridge 24 which is also approximately the circumferential distance about upper edge 45 of annular surface 42.

Figure 1:
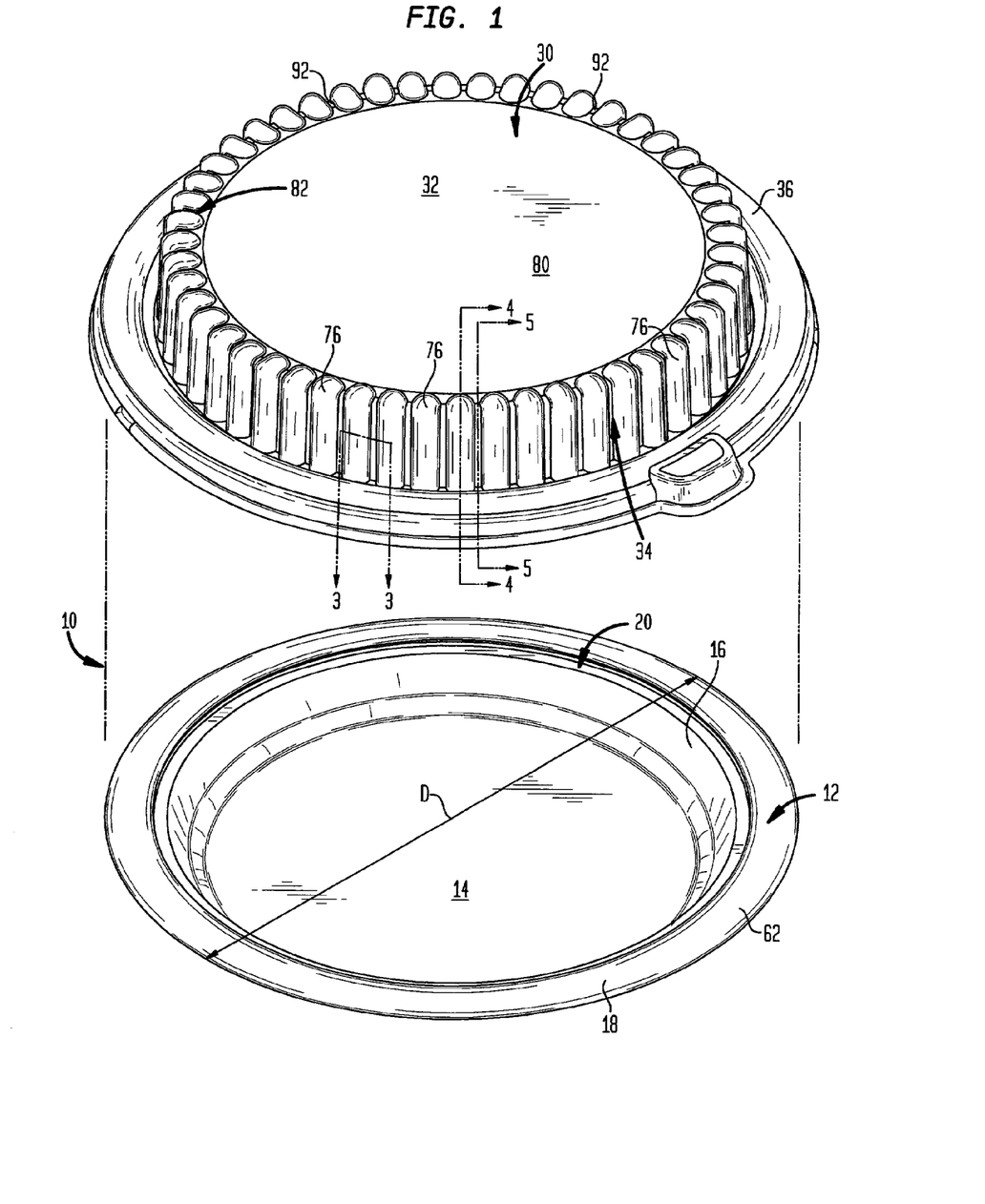
FIG. 1 is an exploded view in perspective showing a serving base member and sealing lid configured in accordance with tie present invention.
Figure 2:
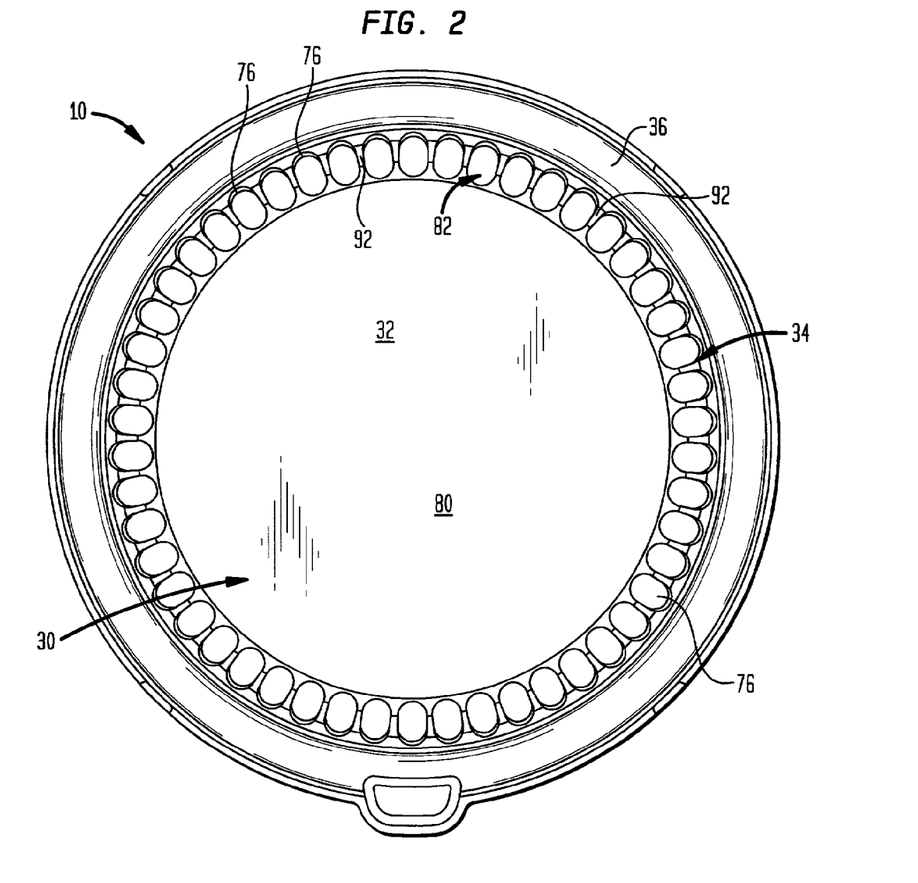
FIG. 2 is atop view of the container of FIG. 1 wherein the sealing lid has been affixed to the serving base member.
Figure 3:
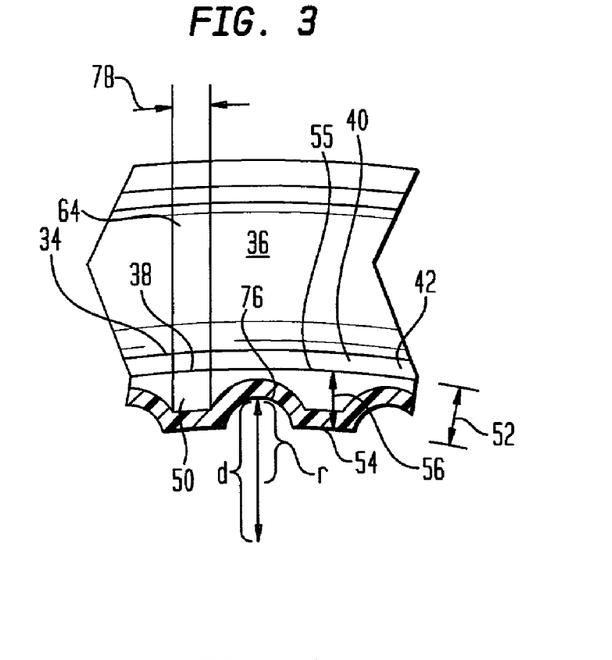
FIG. 3 is a schematic detail along line 3—3 of FIG. 1 showing the geometry of the inventive sealing lid.
Figure 4:
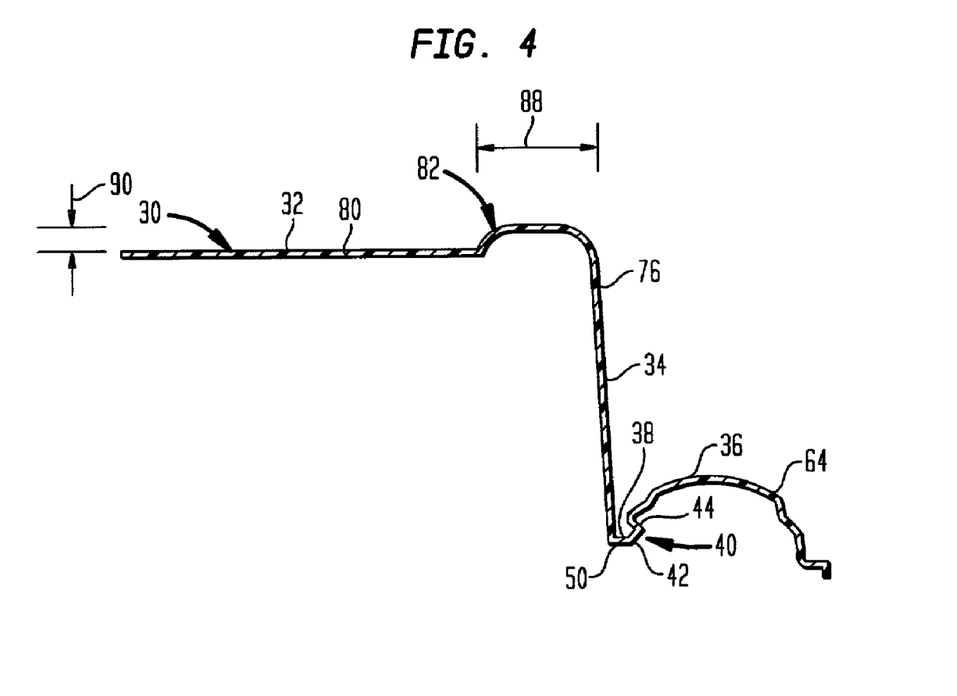
FIG. 4 is a schematic view along line 4—4 of FIG. 1 illustrating the profile of the inventive sealing lid along the centerline of a flute.
Figure 5:
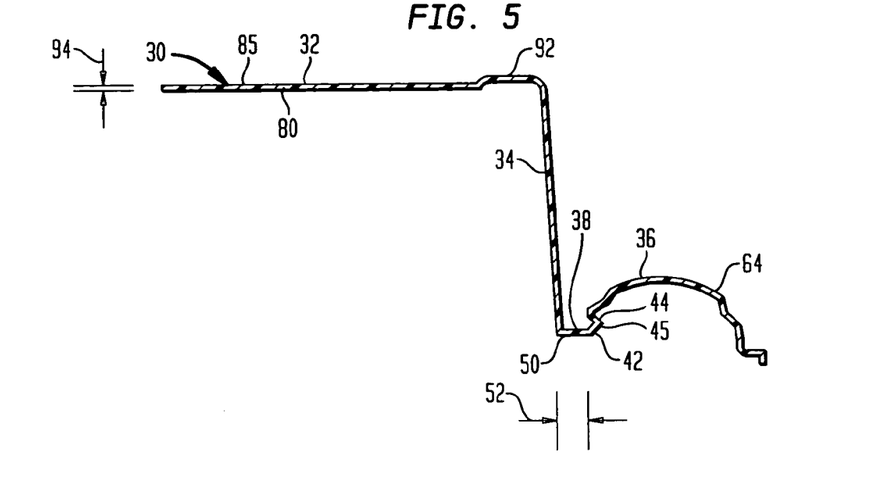
FIG. 5 is a schematic view along line 5—5 or FIG. 1 showing the profile of the flat portion of the sealing lid between the flutes in the sidewall of the lid of the containers.

As shown in FIG. 3, flutes 76 have a characteristic cylindrical diameter, d, which is twice the radius of curvature, r, of the inner surface of the sidewall. As noted above this diameter is typically less than about 0.75 inches.

As will he appreciated from the Figures the outwardly convex flutes are typically circumferentially spaced apart from one another. The outwardly convex flutes are spaced apart a distance 78 (FIG. 3) generally from about 0.05 to about 0.25 inches about the periphery of the lid. So also, the convex flutes project upwardly with respect to generally planar upper surface portion 80 of dome 32 of the sealing lid and define a generally upwardly convex and generally inwardly retaining ridge upper profile 82 as can be seen in the various Figures.

Plate 12 is provided with an annular sidewall stacking recess 84 adjacent generally planar bottom portion 14 at the lower portion of sidewall 16. Recess 84 is adapted to engage generally convex retaining ridge profile 82 of the sealing lid in order to render a plurality of sealable food containers securely stackable with one another as is seen best in FIG. 8.

Typically the upwardly convex retaining ridge profile adjacent the upper, generally planar portion 80 of the sealing lid comprises a plurality of spaced arcuate flute profiles 76 extending inwardly from the outer periphery of the container. The inward extension length 88 (FIGS. 4, 6) of the flutes inwardly adjacent planar portion 80 of dome 32 may be of any suitable length; but typically at least about 0.2 and preferably at least about 0.3 inches in preferred embodiments.

The flutes may have a flute height 90 above generally planar upper surface 85 of dome 32 of greater than about 0.075 inches. In the embodiments shown, there are provided a plurality of flat portions 92 between the upwardly extending flutes 76 having a flat portion height 94 of generally greater than about 0.01 inches. The relative profiles of the flutes and flat portions there between are perhaps best appreciated by reference to FIGS. 4 through 6.

It should be appreciated by reference to FIG. 3, that lid shelf 50 of lid 30 is typically a fluted lid shelf. Radial span 52 is indicated on FIG. 3 as noted above.

Thus, in accordance with the invention there is provided an improved container provided with a relatively wide, preferably substantially horizontal shelf in the base member in the interior thereof defined on the sidewall and a cooperating relatively wide shelf in a matching lid. Moreover, the lid is provided with relatively wide, spaced flutes around the periphery of the center portion of the lid making it easier to force the lid into engagement with the horizontal ledge in the sidewall of the plate without deforming or damaging the lid but also making it possible to stack numerous lid/plate combinations. The upward projection of the sidewall flutes above the center flat portion of the lid is a convenient feature which helps stacking. So also, the matching contour or recess cut into the bottom of the plate which engages (peripherally with a slight clearance) with the flutes defining the periphery of the lid makes it easier to stack and makes the stacks more secure with the lidded plates on top of one another. As will be appreciated from inspection of the appended drawings the radial span of the shelf of the lid may be essentially the same width as the ledge incorporated into the container base making it difficult inadvertently to force a matching lid past the ledge in the sidewall of the plate. The horizontal width of the retaining ledge around the interior of the wall may be, for example, approximately 155 thousandths of an inch.

The improved structure of the lid includes generally a reduced number of flutes, wherein the flutes are both deeper radially and have reinforcing domes extending over the center planar portion of the top of the lid and includes flats between the flutes of the lids which are also slightly raised above the center plane of the center portion on top of the lid. This improvement provides further rigidity to the lid which makes it easier to place and engage the container.

The lid is secured to the container by loosely placing the lid on the plate while the plate is resting on a flat surface, forcing the bottom of the ridges on one side of the lid into engagement with the horizontal ledge of the plate with one hand and then while holding the lid down use the other hand to seat the other side of the lid against the opposite portion of the horizontal ledge in the plate. Alternatively, one portion of the lid may be forced into engagement with the horizontal ledge in the plate using the heel of both hands while the opposite portion of the lid may be forced into engagement with the horizontal ledge on the opposite side of the plate using the fingertips. Preferably, the lid and base are configured such that the seal therebetween is generally liquid proof.

While the invention has been described in detail, various modifications to the specific embodiment illustrated will be readily apparent to those of skill in the art. For example, one could produce a container with additional features such as additional ridges and so forth. Such modifications are within the spirit and scope of the present invention defined in the appended claims.

What is claimed is:

1. A sealable food container comprising:
  (a) a base serving member having a substantially planar base central portion, a base sidewall extending upwardly and outwardly therefrom and a base outer flange portion extending outwardly from said base sidewall;
    said base sidewall comprising a sealing recess disposed between said substantially planar base central portion of said base serving member and said base outer flange portion, the recess comprising (i) an inwardly projecting base stop ridge (ii) an upper extremity; (iii) a lower extremity; and (iv) between the base stop ridge and the lower extremity of the recess, an inwardly facing annular sealing surface at an outer wall of the sealing recess; wherein the base stop ridge is adjacent the upper extremity of the recess;
  (b) a laterally extending, internal retaining shelf located at the lower extremity of the sealing recess;
  (c) a sealing lid provided with a dome portion and a flexible lid sidewall extending downwardly from said dome portion as well as a lid flange portion extending outwardly with respect to said downwardly extending lid sidewall;
    said lid flange portion including at its inner periphery a lid sealing portion with (i) an outwardly facing annular lid sealing surface extending upwardly with respect to said downwardly extending lid sidewall of said sealing lid and (ii) said lid sealing portion further defining a lid stop ridge;
    wherein said base serving member and said sealing lid are configured such that when said sealing lid is forced downwardly on said base serving member said sealing lid is secured to said base serving member by cooperation of said base stop ridge of said base serving member and said lid stop ridge of said sealing lid; wherein said laterally extending retaining shelf of said base serving member extends outwardly over a base sidewall shelf width of at least about 0.5% of the characteristic diameter of said base serving member.

2. The food container according to claim 1, wherein said laterally extending retaining shelf of said base serving member extends outwardly over a base sidewall shelf length of at least about 1% of the characteristic diameter of said base serving member.

3. The food container according to claim 2, wherein said laterally extending retaining shelf of said base serving member extends outwardly over a base sidewall shelf length of at least about 1.5% of the characteristic diameter of said base serving member.

4. The food container according to claim 1, wherein said sealing lid is provided with a laterally extending lid shelf extending between the flexible sidewall of the sealing lid and the annular lid sealing surface of the lid, said lid shelf extending outwardly over a lid shelf radial span and thereby being configured to cooperate with the retaining shelf of the base serving member to position the sealing lid with respect thereto.

5. The food container according to claim 2, wherein said sealing lid is provided with a laterally extending lid shelf extending between the flexible sidewall of the sealing lid and the annular lid sealing surface of the lid, said lid shelf extending outwardly over a lid shelf radial span and thereby being configured to cooperate with the retaining shelf of the base serving member to position the sealing lid with respect thereto.

6. The food container according to claim 3, wherein said sealing lid is provided with a laterally extending lid shelf extending between the flexible sidewall of the sealing lid and the annular lid sealing surface of the lid, said lid shelf extending outwardly over a lid shelf radial span and thereby being configured to cooperate with the retaining shelf of the base serving member to position the sealing lid with respect thereto.

7. The food container according to claim 4, wherein the length of the lid shelf radial span is at least about 25% of the base sidewall shelf length.

8. The food container according to claim 7, wherein the length of the lid shelf radial span is at least about 50% of the base sidewall shelf length.

9. The food container according to claim 8, wherein the length of the lid shelf radial span is at least about 75% of the base sidewall shelf length.

10. The food container according to claim 1, wherein said inwardly facing annular sealing surface of said base serving member is a frustal sealing surface extending upwardly and outwardly with respect to said substantially planar base central portion of said base serving member and said annular lid sealing surface of said lid is a frustal sealing surface extending upwardly and outwardly with respect to said downwardly extending lid sidewall of said sealing lid.

11. The food container according to claim 10, wherein said lid stop ridge is located adjacent the upper edge of said annular lid sealing surface of said sealing lid and wherein said sealing lid is dimensioned so as to outwardly flexibly urge said frustal sealing surface of said lid into surface-to-surface contact with said frustal sealing surface of said base serving member when said base serving member and said sealing lid are secured to one another.

12. The food container according to claim 1, wherein said base outer flange of said base serving member is an arcuate outer flange.

13. The food container according to claim 12, wherein said lid flange portion of said sealing lid is provided with an outer arcuate flange portion generally configured to overlay the arcuate outer flange of the base serving member.

14. The food container according to claim 1, wherein said flexible lid sidewall of said sealing lid is a fluted sidewall.

15. The food container according to claim 14, wherein said dome portion of said sealing lid has a substantially planar dome upper surface portion and a downwardly extending lid sidewall provided with a plurality of outwardly convex flutes formed in said lid sidewall, said flutes having a characteristic cylindrical diameter, wherein said lid includes about 3 or fewer flutes per inch of engagement perimeter.

16. The food container according to claim 15, wherein said outwardly convex flutes are circumferentially spaced apart from one another.

17. The food container according to claim 16, wherein said outwardly convex flutes are spaced apart a circumferential distance of from about 0.05 inches to about 0.25 inches about the periphery of said sealing lid.

18. The sealable food container according to claim 15, wherein said convex flutes of said lid project upwardly with respect to the substantially planar dome upper surface portion of said dome and define a retaining ridge upper profile which is inwardly convex toward the center of the dome and wherein said base sidewall is provided with a mating arcuate annular sidewall recess at a lower portion of said base sidewall configured and dimensioned to engage said inwardly convex retaining ridge profile of said sealing lid in order to render a plurality of said sealable food containers securely stackable with one another.

19. The sealable food container according to claim 18, wherein said generally upwardly convex retaining ridge profile comprises a plurality of spaced arcuate flute profiles extending inwardly from the flexible sidewall of the sealing lid.

20. The food container according to claim 15, wherein said sealing lid includes from about 1.5 to about 2.5 flutes per inch of engagement perimeter.

21. The food container according to claim 20, wherein said sealing lid includes from about 2 to about 2.5 flutes per inch of engagement perimeter.

22. The food container according to claim 15, wherein said flutes have a characteristic cylindrical diameter of from about 0.2 inches to about 0.80 inches.

23. The food container according to claim 15, wherein the characteristic cylindrical diameter of said flutes is at least about 0.75% of the length of engagement perimeter.

24. The food container according to claim 22, wherein the characteristic cylindrical diameter of said flutes is from about 1% to about 2.5% of the length of engagement perimeter.

25. The food container according to claim 15, wherein an upper inward extension length of said flutes adjacent the generally planar upper surface portion of said dome is at least about 0.2 inches.

26. The food container according to claim 25, wherein the upper inward extension length of said flutes adjacent the generally planar upper surface portion of said dome is at least about 0.3 inches.

27. The food container according to claim 18, wherein the upper inward extension length of said flutes above the generally planar upper surface portion of the dome is from about 1% to about 3% of the length of the engagement perimeter.

28. The food container according to claim 18, wherein said flutes have a flute height above the generally planar dome upper surface portion of greater than about 0.07 inches.

29. The food container according to claim 28, wherein said flutes have a flute height above the generally planar dome upper surface portion of from about 0.07 to about 0.15 inches.

30. The food container according to claim 18, wherein said dome portion of said sealing lid is provided with a plurality of generally flat portions between said convex flutes having a span of from about 0.05 to about 0.2 inches.

31. The food container according to claim 30, wherein said flat portions have a height above the generally planar upper surface portion of the dome of from about 0.01 inches to about 0.1 inches.

32. The food container according to claim 14, wherein said sealing lid is provided with a laterally extending lid shelf extending between the flexible sidewall of the sealing lid and the annular lid sealing surface of the lid, said lid shelf extending outwardly over a radial span and being adapted to cooperate with the retaining shelf of the base serving member to position the sealing lid with respect thereto.

33. The food container according to claim 18, wherein said sealing lid is provided with a laterally extending lid shelf extending between the flexible sidewall of the sealing lid and the annular lid sealing surface of the lid, said lid shelf extending outwardly over a radial span and being adapted to cooperate with the retaining shelf of the base serving member to position the sealing lid with respect thereto.

34. The food container according to claim 33, wherein the laterally extending retaining shelf of the base serving member extends outwardly over a base sidewall shelf length of at least about 25 percent of the characteristic diameters of the convex flutes of the sealing lid.

35. The food container according to claim 1, wherein said base serving member is formed from sheet thermoplastic material.

36. The food container according to claim 35, wherein said base serving member is thermoformed, thermoformed by the application of vacuum or thermoformed by a combination of vacuum and pressure.

37. The food container of claim 36, wherein said base server member is made from a foamed or solid polymeric material selected from the group consisting of: polyesters, polystyrenes, polypropylenes, polyethylenes, copolymers and mixtures thereof.

38. The food container according to claim 37, wherein said base serving member is thermoformed from mineral-filled polypropylene sheet.

39. The food container according to claim 38, wherein said base serving member has a wall thickness from about 10 to about 80 mils and consists essentially of from about 40 to about 90 percent by weight of a polypropylene polymer, from about 10 to about 60 percent by weight of a mineral filler, from about 1 to about 15 percent by weight polyethylene, up to about 5 weight percent titanium dioxide and optionally including a basic organic or inorganic compound comprising the reaction product of an alkali metal or alkaline earth element with carbonates, phosphates, carboxylic acids as well as alkali metal and alkaline earth element oxides, hydroxides, or silicates and basic metal oxides, including mixtures of silicon dioxide with one or more of the following oxides: magnesium oxide, calcium oxide, barium oxide, and mixtures thereof.

40. The food container according to claim 35, wherein said base serving member has a wall caliper of from about 10 to about 50 mils.

41. The food container according to claim 40, wherein said base serving member has a wall caliper of from about 12 to about 25 mils.

42. The food container according to claim 1, wherein said sealing lid is formed from sheet of thermoplastic material.

43. The food container according to claim 42, wherein said sealing lid is thermoformed, thermoformed by the application of vacuum or thermoformed by a combination of vacuum and pressure.

44. The food container according to claim 43, wherein said sealing lid is formed of a styrene polymer composition.

45. The food container according to claim 44, wherein said styrene polymer composition comprises a styrene-butadiene copolymer.

46. The food container according to claim 44, wherein said sealing lid is formed of oriented polystyrene.

47. The food container according to claim 43, wherein said sealing lid has a wall caliper of from about 2 to about 15 mils.

48. The food container according to claim 44, wherein said sealing lid has a wall caliper of from about 2 to about 15 mils.

49. The food container according to claim 48, wherein said sealing lid has a wall caliper of from about 5 to about 13 mils.

50. The food container according to claim 46, wherein said sealing lid has a wall caliper of from about 2 to about 15 mils.

51. The food container according to claim 50, wherein said sealing lid has a wall caliper of from about 5 to about 13 mils.

52. A sealable food container comprising:
(a) a base serving member having a substantially planar base central portion, a base sidewall extending upwardly and outwardly therefrom and a base outer flange portion extending outwardly from said base sidewall;
said base sidewall comprising a sealing recess disposed between said substantially planar base central portion of said base serving member and said base outer flange portion, the recess comprising (i) an inwardly projecting base stop ridge (ii) an upper extremity; (iii) a lower extremity; and (iv) between the base stop ridge and the lower extremity of the recess, an inwardly facing annular sealing surface at an outer wall of the sealing recess; wherein the base stop ridge is adjacent the upper extremity of the recess;
(b) a laterally extending, internal retaining shelf located at the lower extremity of the sealing recess;
(c) an inwardly convex annular sidewall stacking recess at a lower portion of said base sidewall;
(d) a sealing lid provided with a dome portion and a flexible lid sidewall extending downwardly from said dome portion as well as a lid flange portion extending outwardly with respect to said downwardly extending lid sidewall;
said lid flange portion including at its inner periphery a lid sealing portion with (i) an outwardly facing annular lid sealing surface extending upwardly with respect to said downwardly extending lid sidewall of said sealing lid and (ii) said lid sealing portion further defining a lid stop ridge;
said sealing lid also being provided with a plurality of outwardly convex flutes in said flexible lid sidewall projecting inwardly at their upper portions to define an upper retaining ridge profile which is substantially inwardly disposed toward the center of the dome with respect to said flexible-lid sidewall, the retaining ridge profile also being configured so that it is inwardly and upwardly convex;

wherein said base serving member and said sealing lid are configured such that when said sealing lid is forced downwardly on said base serving member said sealing lid is secured to said base serving member by cooperation of said base stop ridge of said base serving member and said lid stop ridge of said sealing lid; wherein said laterally extending retaining shelf of said base serving member extends outwardly over a base sidewall shelf width of at least about 0.5% of the characteristic diameter of said base serving member and wherein further said inwardly convex annular sidewall stacking recess at the lower portion of the sidewall of said base serving member is configured to engage said inwardly and upwardly convex retaining ridge profile of said sealing lid to render a plurality of said sealable food containers securely stackable with one another.

53. The food container according to claim 52, wherein said base sealing portion comprises (i) a sealing recess, (ii) a base stop ridge adjacent an upper extremity of said sealing recess as well as (iii) a laterally extending base retaining shelf adjacent a lower extremity of said sealing recess.

54. The food container according to claim 53, wherein said sealing lid is provided with a laterally extending lid shelf extending between the flexible lid sidewall of the sealing lid and the annular sealing portion of the lid, said lid shelf extending outwardly over a lid shelf radial span and thereby being configured to cooperate with the base retaining shelf of the base serving member to position the sealing lid with respect thereto.

55. The food container according to claim 52, wherein said outer flange of said base serving member is an arcuate outer flange.

56. The food container according to claim 55, wherein said sealing lid is provided with an outer arcuate flange portion generally configured to overlay the arcuate outer flange of the base serving member.

57. The food container according to claim 52, wherein said lid includes about 3 or fewer flutes per inch of engagement perimeter.

58. The food container according to claim 52, wherein said inwardly and upwardly convex retaining ridge profile comprises a plurality of spaced arcuate flute profiles extending inwardly from the outer periphery of the container.

59. The food container according to claim 52, wherein said outwardly convex flutes are circumferentially spaced apart from one another.

60. The food container according to claim 59, wherein said outwardly convex flutes are spaced apart a distance of from about 0.05 to about 0.25" about the periphery of said sealing lid.

61. The food container according to claim 52, wherein said flutes have a flute height above the generally planar upper surface portion of said dome of greater than about 0.07 inches.

62. The food container according to claim 61, wherein said flutes have a flute height above the generally planar upper surface portion of said dome of from about 0.07 to about 0.15 inches.

63. The food container according to claim 52, wherein said dome portion of said sealing lid is provided with a plurality of generally flat portions between said convex flutes having a span of from 0.05 to about 0.2 inches.

64. The food container according to claim 63, wherein said flat portions have a height above the generally planar upper surface portion of the dome of from about 0.01 inches to about 0.1 inches.

65. The food container according to claim 52, wherein said base serving member is formed from sheet thermoplastic material.

66. The food container according to claim 52, wherein said base serving member is thermoformed, thermoformed by the application of vacuum or thermoformed by a combination of vacuum and pressure.

67. The food container of claim 66, wherein said base serving member is made from a foamed or solid polymeric material selected from the group consisting of: polyesters, polystyrenes, polypropylenes, polyethylenes, copolymers and mixtures thereof.

68. The food container according to claim 67, wherein said base serving member is thermoformed from mineral-filled polypropylene sheet.

69. The food container according to claim 68, wherein said base serving member has a wall thickness from about 10 to about 80 mils and consists essentially of from about 40 to about 90 percent by weight of a polypropylene polymer, from about 10 to about 60 percent by weight of a mineral filler, from about 1 to about 15 percent by weight polyethylene, up to about 5 weight percent titanium dioxide and optionally including a basic organic or inorganic compound comprising the reaction product of an alkali metal or alkaline earth element with carbonates, phosphates, carboxylic acids as well as alkali metal and alkaline earth element oxides, hydroxides, or silicates and basic metal oxides, including mixtures of silicon dioxide with one or more of the following oxides: magnesium oxide, calcium oxide, barium oxide, and mixtures thereof.

70. The food container according to claim 65, wherein said base serving member has a wall caliper of from about 10 to about 50 mils.

71. The food container according to claim 70, wherein said base serving member has a wall caliper of from about 12 to about 25 mils.

72. The food container according to claim 52, wherein said sealing lid is formed from a sheet of thermoplastic material.

73. The food container according to claim 72, wherein said sealing lid is thermoformed, thermoformed by the application of vacuum or thermoformed by a combination of vacuum and pressure.

74. The food container according to claim 73, wherein said sealing lid is formed of a styrene polymer composition.

75. The food container according to claim 74, wherein said styrene polymer composition comprises a styrene-butadiene copolymer.

76. The food container according to claim 74, wherein said sealing lid is formed of oriented polystyrene.

77. The food container according to claim 73, wherein said sealing lid has a wall caliper of from about 2 to about 15 mils.

78. The food container according to claim 74, wherein said sealing lid has a wall caliper of from about 2 to about 15 mils.

79. The food container according to claim 78, wherein said sealing lid has a wall caliper of from about 5 to about 13 mils.

80. The food container according to claim 76, wherein said sealing lid has a wall caliper of from about 2 to about 15 mils.

81. The food container according to claim 80, wherein said sealing lid has a wall caliper of from about 5 to about 13 mils.

82. A sealable food container comprising:
(a) a base serving member having a substantially planar base central portion, a base sidewall extending upwardly and outwardly therefrom and a base outer flange portion extending outwardly from said base sidewall;
   said base sidewall comprising a sealing recess disposed between said substantially planar base central portion of said base serving member and said base outer flange portion, the recess comprising (i) an inwardly projecting base stop ridge (ii) an upper extremity; (iii) a lower extremity; and (iv) between the base stop ridge and the lower extremity of the recess, an inwardly facing annular sealing surface at an outer wall of the sealing recess; wherein the base stop ridge is adjacent the upper extremity of the recess;
   said base outer flange portion defining a continuous arc extending between the sealing recess in the sidewall to the outer edge of the container;
(b) a laterally extending, internal retaining shelf located at the lower extremity of the sealing recess;
(c) a sealing lid provided with a dome portion and a flexible lid sidewall extending downwardly from said dome portion as well as a lid flange portion extending outwardly with respect to said downwardly extending lid sidewall;
said lid flange portion including at its inner periphery a lid sealing portion with (i) an outwardly facing annular lid sealing surface extending upwardly with respect to said downwardly extending lid sidewall of said sealing lid and (ii) said lid sealing portion further defining a lid stop ridge;
wherein said base serving member and said sealing lid are configured such that when said sealing lid is forced downwardly on said base serving member said sealing lid is secured to said base serving member by cooperation of said base stop ridge of said base serving member and said lid stop ridge of said sealing lid; wherein said laterally extending retaining shelf of said base serving member extends outwardly over a base sidewall shelf width of at least about 0.5% of the characteristic diameter of said base serving member.

* * * * *